(12) United States Patent
Cabot

(10) Patent No.: US 7,991,987 B2
(45) Date of Patent: Aug. 2, 2011

(54) COMPARING TEXT STRINGS

(75) Inventor: Mason Cabot, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 1118 days.

(21) Appl. No.: 11/801,655

(22) Filed: May 10, 2007

(65) Prior Publication Data
US 2008/0282073 A1 Nov. 13, 2008

(51) Int. Cl.
G06F 7/00 (2006.01)
G06F 15/00 (2006.01)
G06F 7/02 (2006.01)
G05B 1/00 (2006.01)

(52) U.S. Cl. .................. 712/300; 340/146.2; 708/212

(58) Field of Classification Search .............. 708/212, 708/671; 712/300
See application file for complete search history.

(56) References Cited

U.S. PATENT DOCUMENTS

| T922,008 | I4 | * | 5/1974 | Gause et al. | 712/300 |
|---|---|---|---|---|---|
| 5,175,860 | A | * | 12/1992 | Yamada | 1/1 |
| 5,212,697 | A | * | 5/1993 | Morita | 714/820 |
| 5,604,910 | A | * | 2/1997 | Kojima et al. | 1/1 |
| 5,724,572 | A | * | 3/1998 | Dieffenderfer et al. | 1/1 |
| 2008/0077773 | A1 | * | 3/2008 | Julier et al. | 712/210 |

OTHER PUBLICATIONS

"A Generic—Reusable Diff Algorithm in C#", posted by aprenot on codeproject.com, 2004, retrieved from http://www.codeproject.com/KB/recipes/c_diff_algorithm.aspx.*
Seconi et al., U.S. Appl. No. 11/525,981, filed Sep. 22, 2006, entitled "Instruction and Logic for Processing Text Strings".

* cited by examiner

*Primary Examiner* — Lewis A Bullock, Jr.
*Assistant Examiner* — Matthew Sandifer
(74) *Attorney, Agent, or Firm* — Trop, Pruner & Hu, P.C.

(57) ABSTRACT

A shorter and a longer text string may be compared. Instead of simply comparing the characters only one character at a time, more than one character can be compared at a time. In addition, a null terminated string may be detected. The shorter strings may be handled differently than longer strings.

12 Claims, 3 Drawing Sheets

COMPARING TEXT STRINGS

BACKGROUND

The present disclosure pertains to the field of processing apparatuses and associated software sequences that perform logical and mathematical operations.

Processing of text information communicated between computing or communication devices has become increasingly important for current computing and communication devices. Particularly, interpretation by a communication or computing device of strings of text information include some of the most important operations performed on text data. Such operations may be computationally intensive, but offer a high level of data parallelism that can be exploited through an efficient implementation using various data storage devices, such as for example, single instruction multiple data (SIMD) registers.

DETAILED DESCRIPTION

Figure 1:
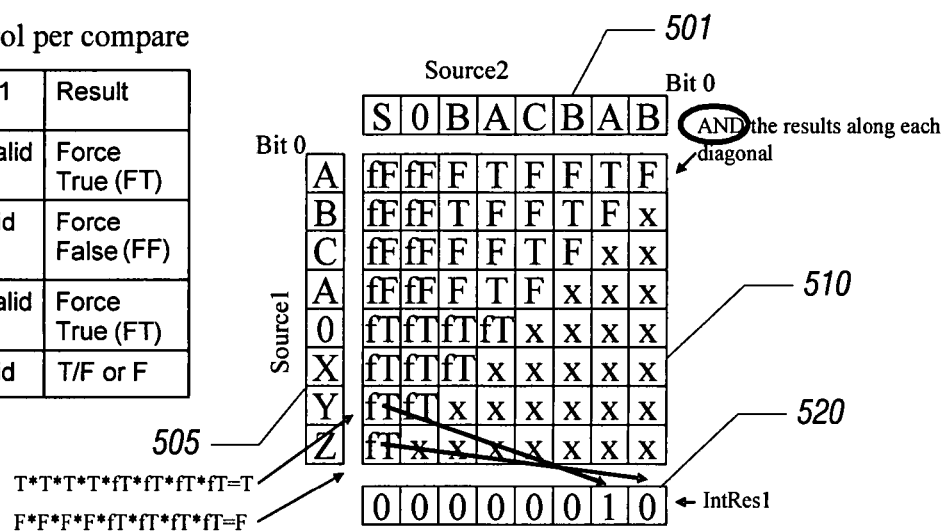
FIG. 1 is a depiction of an array for ordered string compare with null termination.

Embodiments of the present invention involve implementing one or more string comparison operations. A text comparison operation generally involves comparing data elements from two strings of data to determine which data elements match. In a generalized sense, one embodiment of a text comparison operation as applied to individual data elements in two packed operands representing two strings of data can be generically represented as:

DEST1←SRC1 cmp SRC2;

For a packed SIMD data operand, this generic operation can be applied to each data element position of each operand. In the above operation, "DEST" and "SRC" are generic terms to represent the destination and source of the corresponding data or operation. In some embodiments, they may be implemented by registers, memory, or other storage areas having other names or functions than those depicted.

Furthermore, in one embodiment, a string comparison operation may generate an indicator of whether each element of one of the source registers is equal to each element of the other source register and store the indicator into a register, such as DEST1. In one embodiment, the indicator is an index value, whereas in other embodiments the indicator may be a mask value.

The Boyer-Moore-Horspool algorithm (BMH) finds a pattern string (needle, length n) within a search string (haystack, length h greater than n). The algorithm begins by building a skip table in memory, typically implemented as an array, that indicates the offset of each character within the needle string. It then looks at the nth character of the haystack string to see if it matches the character within the needle string by indexing into the skip table with the value of the nth character in the haystack. If an exact match is not found (the value of the skip table entry is non-zero), the algorithm skips forward by the skip value and begins another character comparison. If a match is found (skip table entry is zero), the algorithm looks backwards into the haystack string to see if it matches the needle string. The first part of the search uses array indexing and the second part of the search uses memory compares.

A standard C function, MEMCMP( ) could be used to perform the second part of the search using the memory compare on the two strings. The MEMCMP( ) function takes two operands and a length, comparing the two regions in memory for a length in bytes specified. The MEMCMP( ) function may use one assembly language instruction, such as CMP, CMPS, or PCMPEQ. These instructions may compare two values of up to 8, or even 16, bytes length in a single instruction. They have no concept of null terminated strings.

Therefore, the comparison needs to be properly aligned. A data comparison may end misaligned on a boundary that is smaller than 16 bytes and the appropriate line comparison instructions are selected to compare only the valid regions of the strings. This consumes computing resources and slows string comparison as the compare instruction must operate on smaller length operands (byte, word, double word, or quad word). This short string or misaligned string compare may happen when the needle string is short or at the ends of the needle and haystack strings.

The string comparison section of a BMH search may be accelerated to compare many characters at a time and to detect null terminated strings. The hardware may be thought of some matrix of results derived from the two strings being compared as suggested. To compare strings, exact match semantics may be used to determine if two 16 byte regions match exactly. Alignment of the memory regions is handled by the implementation of the BMH algorithm that starts by aligning the last character in the needle string with a matching character in the haystack string. The search hardware detects null terminated strings and compares two strings of up to 16 bytes in length in a single processor clock cycle.

FIG. 1 illustrates an example matrix comparing hardware operating on two shorter strings. For clarity, the figure shows an 8 character compare. The strings are compared character-by-character with the intermediate result (IntRes1) being the AND of the results along each of eight diagonals. This allows a character-by-character ordered comparison. In the event of a null termination, the matrix forces false if the haystack string has terminated and the needle is valid or a forced true if the needle string is terminated.

Thus, the result of the comparison of the source 1 bit 0, which is A, and the source 2 bit 0, which is B, is equal to false because both bits are valid but they are not the same. Similarly, the comparison of A in source 1 with the next bit to the left (A) in source 2, results in true because both are valid and the same. Conversely, comparison of bit 0 on source 1, which is A, to bit 7 of source 2, which is S, is forced false because the source 2 bit is invalid. Similarly, a comparison between the source 1 bit X and the source 2 bit S is forced true because both are invalid.

The initial results IntRes1 are the results of an AND operation along each diagonal. Thus, the first bit on the right in the IntRes1 is 0 because the first diagonal has comparisons that are false. The next bit is 1 because the second diagonal to the left has all true. The remaining bits are zero because they all have at least one false in their diagonals.

In one embodiment, the arrays 501 and 505 contain entries which indicate whether each of the elements of a first operand and a second operand, respectively, are valid. For example, in the above illustration, the array 501 array may contain a "1" in each array element for which a first operand contains a corresponding valid data element. Similarly, array 505 may contain a "1" in each array element for which a second operand contains a corresponding valid data element. In one embodiment, the arrays 501 and 505 may contain ones starting in array element zero for each valid element present in each of two respective operands. For example, if a first operand contains four valid elements, array 501 may contain ones only in the first four array elements and all other array elements of array 501 may be zeros, in one embodiment.

In one embodiment, the arrays 501 and 505 are each 16 elements in size to represent 16 data elements of two 128 bit operands, each 8 bits (1 byte) in size.

In one embodiment, each data element of a first operand is compared to each data element of a second operand, the result of which may be represented by an i×j array 510. For example, a first data element of a first operand, representing a text string, for example, may be compared to each data element in another operand, representing another text string, and a "1" stored in each array element within the first row of the array 510 corresponding to a match between the first data element of the first operand and each of the data elements of the second operand. This may be repeated for each data element in the first operand until the array 510 is completed.

In one embodiment, the result array 520 may indicate the presence of data elements in one operand which have relationships to one or more data elements in the other operand. For example, result array 520 may store bits to indicate whether there are any data elements which are within any of a set of ranges defined by data elements in the other operand, by AND'ing pairs of elements from array 515 and OR'ing all of the results from the AND'ing.

FIG. 1 also illustrates a result array 520 to store various indicators pertaining to the comparison between data elements of at least two packed operands. For example, result array 520 may store bits to indicate whether there are any equal data elements between the two operands, by OR'ing the corresponding elements of the array 515. If any of the array elements of array 515 contains a "1", for example, indicating that a match exists between valid data elements of the operands, then this may be reflected in result array 520, whose elements may also be OR'ed to determine if any valid data elements of the operands are equal.

In one embodiment, a contiguous string of valid matches between the data elements of two operands is detected within the result array 520 by detecting adjacent "1" values within the array. In one embodiment, this may be accomplished by AND'ing at two contiguous result array elements at a time and AND'ing the result of one AND operation with the next result entry until a "0" is detected.

In one embodiment, the result array 520 may indicate whether each data element of both operands match by returning a "1", for example, in the corresponding result array entry. In order to determine whether all of the entries are equal, an XOR operation may be performed on the result array entries.

Additional acceleration of the string searching can be enabled by examining the length of the needle string. The algorithm achieves good speed up for long needle string, but it is less effective for short strings. With short strings, the algorithm only allows skips on matches and these skips may only be as long as the needle string. Short needle strings necessitate a greater number of character match operations as the skip length is short. The string search hardware herein allows for the acceleration of these short strings. Any strings shorter than or equal to the 16 byte string search register may be loaded in its entirety across one edge of the comparison matrix.

For the short string, the algorithm may be shortened, opting to skip a full 16 bytes at a time through the haystack string. Using a partial match capability, the entire string can be compared to the portion of the haystack string being searched. If the string matches in its entirety any offset within the haystack string, the corresponding diagonal of the string search software indicates a match. The hardware can also detect partial matches along the edge of the matrix. This partial match is then stored in a software state variable indicating the length of the partial match. After skipping to the next 16 bytes of the haystack string, a new compare result and state variable are examined to determine if a complete match is present within the haystack string.

Figure 2:
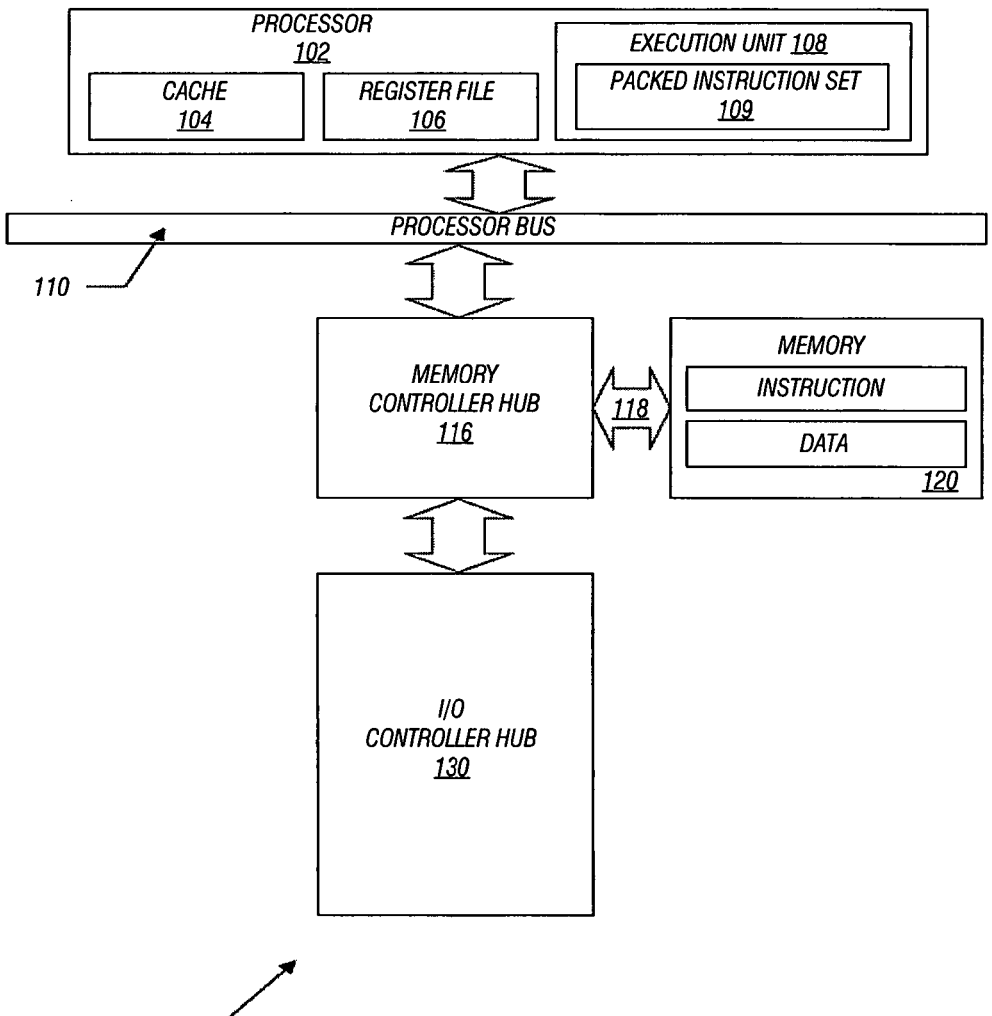
FIG. 2 is a block diagram of a computer system formed with a processor that includes execution units to execute an instruction for string comparison operations in accordance with one embodiment of the present invention.

An exemplary computer system 100, shown in FIG. 2, is formed with a processor that includes execution units to execute an instruction for a string comparison operation in accordance with one embodiment. System 100 includes a processor 102 to employ execution units including logic to perform algorithms for process data. The processor 102 includes one or more execution units 108 to perform an algorithm to compare data elements from one or more operands in accordance with one embodiment of the present invention.

In one embodiment, the processor 102 includes a Level 1 (L1) internal cache memory 104. For this embodiment, execution unit 108 includes logic to handle a packed instruction set 109. A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. The MCH 116 is coupled to memory 120 through a memory interface 118 and to an input/output controller hub 130.

Figure 3:
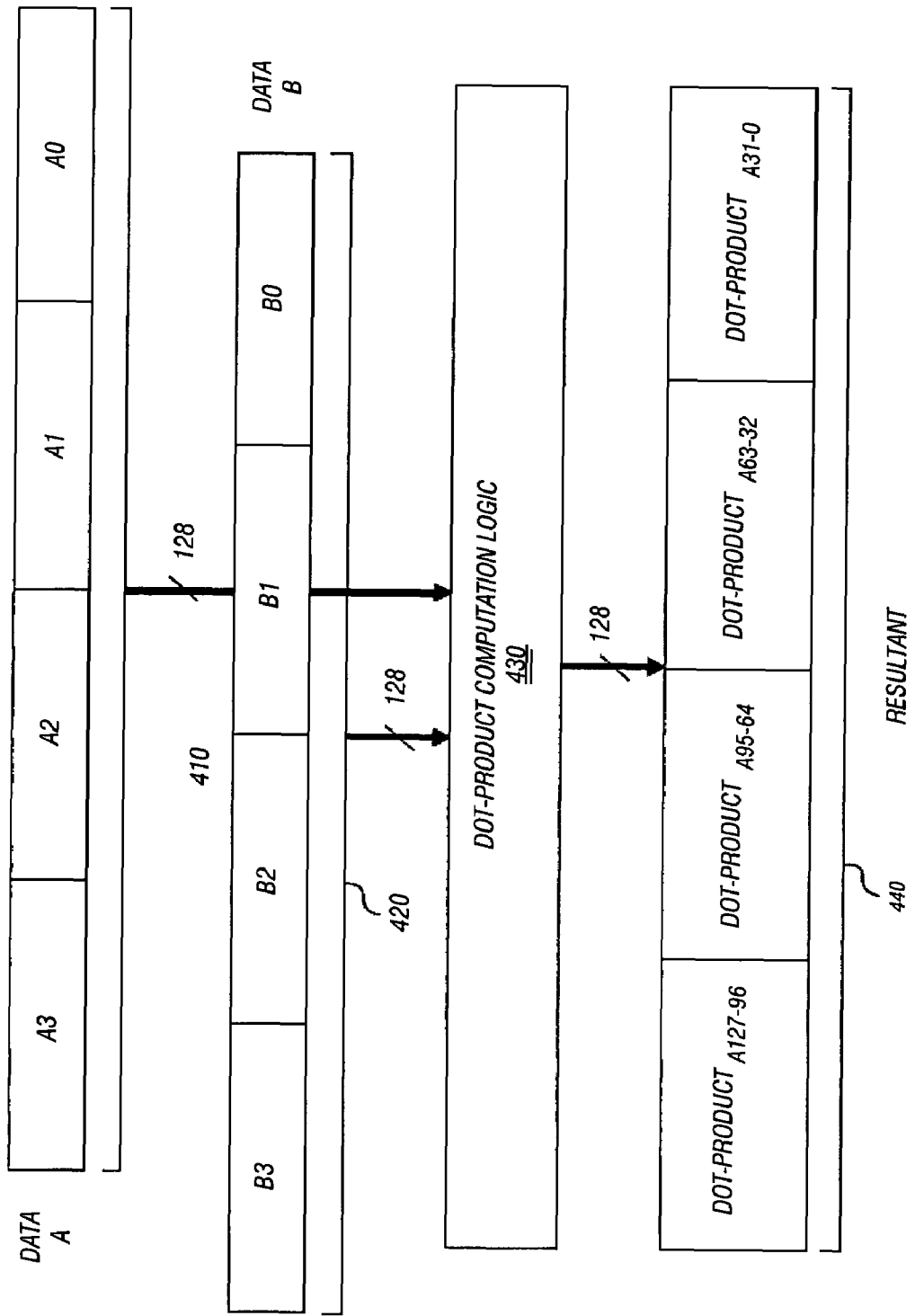
FIG. 3 is a block diagram of a logic to perform at least one string comparison operation on one or more single precision packed data operands in accordance with one embodiment of the present invention.

In one embodiment, a string comparison instruction compares each element of a first data operand DATA A 410, shown in FIG. 3, with each element of a second data operand DATA B 420, and the result of each comparison stored in a RESULTANT 440 register. In one embodiment, a text string compare instruction (e.g., "PCMPxSTRy") is decoded into one micro-operation. For this example, the operands 410, 420, are 128 bit wide pieces of information stored in a source register/memory having word wide data elements. In one embodiment, the operands 410, 420, are held in 128 bit long SIMD registers, such as 128 bit SSEx XMM registers.

In one embodiment, the first operand 410 is comprised of a set of eight data elements: A7, A6, A5, A4, A3, A2, A1, and A0. Each comparison between elements of the first and second operands may correspond to a data element position in the resultant 440. In one embodiment, the second operand 420 is comprised of another set of eight data segments: B7, B6, B5, B4, B3, B2, B1, and B0. The data segments here are of equal length and each comprise a single word (16 bits) of data. However, data elements and data element positions can possess other granularities other than words. If each data element was a byte (8 bits), doubleword (32 bits), or a quadword (64 bits), the 128 bit operands would have sixteen byte wide, four doubleword wide, or two quadword wide data elements, respectively.

The operands 410, 420, can reside either in a register or a memory location or a register file or a mix. The data operands 410, 420, are sent to the string comparison logic 430 of an execution unit in the processor along with a text string compare instruction. For one embodiment, the two data operands 410, 420, are received at string comparison logic 430. In one embodiment, the text-string comparison logic generates an indication of whether two elements of two data operands are equal. In one embodiment, only valid elements of each operand are compared, which may be indicated by another register or memory location for each element in each operand. In one embodiment, each element of operand 410 is compared with each element of operand 420, which may generate a number of comparison results equal to the number of elements of operand 410 multiplied by the number elements of operand 420.

In one embodiment, valid data elements in each operand may be implicitly indicated by the use of null or "zero" fields stored within one or both of the operands. For example, in one embodiment a null byte (or other size) may be stored in an element to indicate that all more significant data elements than the null byte are invalid, whereas all less significant data elements than the null byte are valid and therefore should be compared to the corresponding valid data elements of the other operand. Furthermore, in one embodiment, valid data elements of one operand may be explicitly indicated, whereas the valid data elements of the other operand may be implicitly indicated using null fields. In one embodiment, valid data elements are indicated by a count corresponding to the number of valid data elements or sub-elements within one or more source operands.

Figure 4:
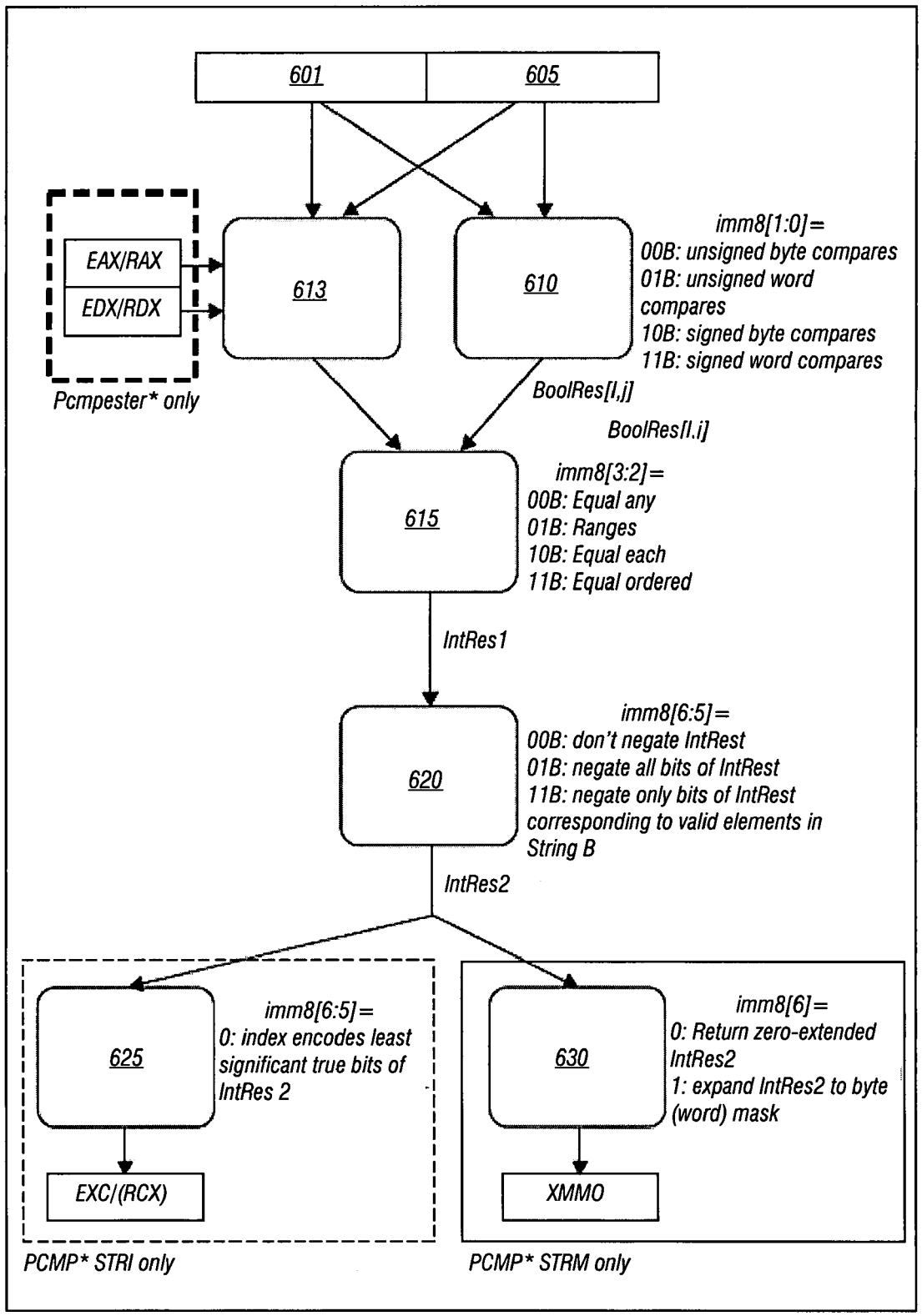
FIG. 4 illustrates operations that may be performed in one embodiment of the invention.

Referring to FIG. 4, each element of a first SIMD operand 601 and a second SIMD operand 605 may be compared to each other at operation 610. In one embodiment, one operand may be stored in a register, such as an XMM register, whereas the other operand may be stored in another XMM register or in memory. In one embodiment, the type of comparison may be controlled by an immediate field corresponding to an instruction performing the operations. For example, in one embodiment, two bits of an immediate field (e.g., IMM8[1:0]) may be used to indicate whether the data elements to be compared are signed bytes, signed words, unsigned bytes, or unsigned words. In one embodiment, the result of the comparison may generate an i×j array (e.g., BoolRes[i,j]) or some portion of an i×j array.

In parallel, the end of each string represented by operands 601 and 605 is found and the validity of each element of operand 601 and 605 may be determined at operation 613. In one embodiment, the validity of each element of operands 601 and 605 is indicated explicitly by setting a corresponding bit or bits within a register or memory location. In one embodiment, the bit or bits may correspond to the number of consecutive valid data elements (e.g., bytes) starting from the least significant bit position of the operand 601 and 605. For example, a register, such as an EAX or RAX register, may be used to store bits indicating the validity of each data element of the first operand, depending on the size of the operand. Similarly, a register, such as an EDX or RDX, may be used to store bits indicating the validity of each data element of the second operand, depending on the size of the operand.

In one embodiment, the comparison and validity information may be combined by an aggregation function at operation 615 to produce some result of comparing the elements of the two operands. In one embodiment, the aggregation function is determined by an immediate field associated with an instruction to perform the comparison of the elements of the two operands. For example, in one embodiment, the immediate field may indicate whether the comparison is to indicate whether any of the data elements of the two operands are equal, whether any ranges (continuous or non-continuous) of data elements in the two operands are equal, whether each data element of the two operands are equal, or whether the operands share an equal ordering of at least some data elements.

The result of the aggregation function (stored in IntRes1 array, for example) may be negated, in one embodiment, at operation 620. In one embodiment, bits of an immediate field (e.g., IMM8[6:5]) may control the type of negating function to be performed on the aggregation function result. For example, immediate fields may indicate that the aggregation results are not to be negated at all, that all results of the aggregation function are to be negated, or that only aggregation results corresponding to valid elements of the operands are to be negated. In one embodiment, the result of the negating operation may be stored into an array (e.g., IntRes2 array).

The result array generated by the negating operation may be converted into an index or a mask value, in one embodiment at operations 625 and 630, respectively. If the negating operation result is converted into an index, bits of an immediate field (e.g., IMM8[6]) may control whether the most significant bit(s) or the least significant bit(s) of the result of the comparison is/are encoded into an index, the result of which may be stored into a register (e.g., ECX or RCX). If the result of the negating operation is to be represented with a mask value in one embodiment, bits of an immediate field (e.g., IMM8[6]) may be used to control whether the mask is to be zero-extended or expanded to a byte (or word) mask.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A non-transitory computer readable medium storing instructions to enable a computer to:
   compare a first string of characters on a first edge of a hardware matrix and a second string of characters on a second edge of the matrix by comparing each character of each of the strings to each character in the other of the strings, wherein the first string is shorter than the second string;
   populate entries of the matrix with results of the comparisons, wherein each result indicates whether a corresponding character of the first string matches a corresponding character of the second string;
   detect a null termination character in each of the strings;
   indicate the null termination character and all following characters in each string are invalid;
   change the entries in said matrix to indicate a match for comparisons with invalid characters of the first string, and to indicate no match for comparisons of a valid character of the first string with an invalid character of the second string; and
   perform an AND operation on the matrix entries in each of the matrix diagonals between the first and second edges of the matrix, wherein the result of the AND operation indicates the result of the comparison of the first and second strings.

2. The medium of claim 1 storing instructions to examine the length of the first string.

3. The medium of claim 2 storing instructions to load the first string entirely across the first edge of the matrix, wherein the first string is shorter than 16 bytes.

4. The medium of claim 3 storing instructions to compare the entire first string to a portion of the second string.

5. The medium of claim 4 storing instructions to determine if the first string entirely matches a portion of the second string.

6. The medium of claim 5 storing instructions to determine if the first string partially matches a portion of the second string and, if so, storing the length of the partial match.

7. A system comprising:
a processor; and
a memory coupled to said processor storing instructions to:
compare a first string of characters on a first edge of a hardware matrix and a second string of characters on a second edge of the matrix by comparing each character of each of the strings to each character in the other of the strings, wherein the first string is shorter than the second string;
populate entries of the matrix with results of the comparisons, wherein each result indicates whether a corresponding character of the first string matches a corresponding character of the second string;
detect a null termination character in each of the strings;
indicate the null termination character and all following characters in each string are invalid;
change the entries in said matrix to indicate a match for comparisons with invalid characters of the first string, and to indicate no match for comparisons of a valid character of the first string with an invalid character of the second string; and
perform an AND operation on the matrix entries in each of the matrix diagonals between the first and second edges of the matrix, wherein the result of the AND operation indicates the result of the comparison of the first and second strings.

8. The system of claim 7 storing instructions to examine the length of the first string.

9. The system of claim 8 storing instructions to load the first string entirely across the first edge of the matrix, wherein the first string is shorter than 16 bytes.

10. The system of claim 9 storing instructions to compare the entire first string to a portion of the second string.

11. The system of claim 10 storing instructions to determine if the first string entirely matches a portion of the second string.

12. The system of claim 11 storing instructions to determine if the first string partially matches a portion of the second string and, if so, storing the length of the partial match.

* * * * *